(12) United States Patent
Petrucelli et al.

(10) Patent No.: US 9,541,470 B2
(45) Date of Patent: Jan. 10, 2017

(54) COMBINATION TIRE TEMPERATURE, PRESSURE AND DEPTH MEASURING DEVICE

(71) Applicant: Measurement Ltd., Grand Cayman (KY)

(72) Inventors: Steven Petrucelli, Cranbury, NJ (US); Mark Kuskovsky, Naples, FL (US)

(73) Assignee: Measurement Ltd., Grand Cayman (KY)

( * ) Notice: Subject to any disclaimer, the term of this patent is extended or adjusted under 35 U.S.C. 154(b) by 656 days.

(21) Appl. No.: 13/665,352

(22) Filed: Oct. 31, 2012

(65) Prior Publication Data

US 2013/0185005 A1 Jul. 18, 2013

Related U.S. Application Data

(60) Provisional application No. 61/553,691, filed on Oct. 31, 2011.

(51) Int. Cl.
*G01L 7/00* (2006.01)
*G01M 17/02* (2006.01)
*G01L 17/00* (2006.01)
*B60C 25/00* (2006.01)

(52) U.S. Cl.
CPC ............ *G01M 17/02* (2013.01); *G01L 17/005* (2013.01); *B60C 25/00* (2013.01); *G01L 17/00* (2013.01)

(58) Field of Classification Search
USPC .......................................................... 702/50
See application file for complete search history.

(56) References Cited

U.S. PATENT DOCUMENTS

| 4,334,215 | A |   | 6/1982  | Frazier et al. |
|-----------|---|---|---------|----------------|
| 4,966,034 | A |   | 10/1990 | Bock et al.    |
| 4,994,792 | A | * | 2/1991  | Ziegler, Jr. ........... G08B 21/182 340/584 |
| 5,230,243 | A |   | 7/1993  | Erich          |
| 5,274,355 | A |   | 12/1993 | Galan          |
| 5,297,424 | A |   | 3/1994  | Sackett        |
| 5,513,525 | A |   | 5/1996  | Schurmann      |
| 5,587,698 | A |   | 12/1996 | Genna          |
| 5,730,526 | A |   | 3/1998  | Davis et al.   |
| 5,987,978 | A |   | 11/1999 | Whitehead      |
| 6,034,596 | A | * | 3/2000  | Smith et al. .................. 340/447 |
| 6,518,875 | B2|   | 2/2003  | DeZorzi        |

(Continued)

OTHER PUBLICATIONS

Woodford, C., Pyrometers [online], 2009[retrieved on Sep. 29, 2015]. Retrieved from the Internet: <URL: http://www.explainthatstuff.com/how-pyrometers-work.html>.*

(Continued)

*Primary Examiner* — Paul D Lee
(74) *Attorney, Agent, or Firm* — Howard IP Law Group, PC

(57) ABSTRACT

A system for measuring tire pressure and temperature including a pressure sensor, a temperature sensor, a processor responsive to an output of the pressure sensor and the temperature sensor, and a display. The processor is configured to output a value on the display indicative of a measured tire pressure and an indication of measured tire temperature, wherein the indication of measured tire temperature comprises an indication of the result of a comparison between the measured tire temperature and a predetermined temperature value.

21 Claims, 8 Drawing Sheets

(56) References Cited

U.S. PATENT DOCUMENTS

| | | | |
|---|---|---|---|
| 6,722,193 B1 | 4/2004 | Conway | |
| 6,779,392 B2 | 8/2004 | Bell et al. | |
| 6,838,983 B1 | 1/2005 | Wong | |
| 6,958,686 B2 | 10/2005 | Okubo | |
| 7,383,724 B2 | 6/2008 | Petrucelli | |
| 8,573,046 B1* | 11/2013 | Ohm et al. | 73/146.3 |
| 2002/0075144 A1 | 6/2002 | DeZorzi | |
| 2003/0120453 A1* | 6/2003 | Hayashi et al. | 702/140 |
| 2003/0121318 A1 | 7/2003 | Bell et al. | |
| 2004/0153281 A1 | 8/2004 | Jaynes | |
| 2004/0164855 A1 | 8/2004 | Okubo | |
| 2007/0186636 A1 | 8/2007 | Wise et al. | |
| 2009/0031795 A1* | 2/2009 | Kokubu et al. | 73/146.5 |
| 2009/0184814 A1 | 7/2009 | Lee et al. | |
| 2012/0139717 A1* | 6/2012 | Cao | 340/449 |
| 2013/0169813 A1* | 7/2013 | Schaefer | 348/148 |

OTHER PUBLICATIONS

International Search Report dated Jan. 18, 2013 for counterpart International Application No. PCT/US 12/62791.

PCT International Preliminary Report on Patentability dated Nov. 8, 2013, for International Application No. PCT/US2012/062791.

* cited by examiner

COMBINATION TIRE TEMPERATURE, PRESSURE AND DEPTH MEASURING DEVICE

CROSS-REFERENCE TO RELATED APPLICATION

This application claims the benefit of and priority to U.S. Provisional Patent Application Ser. No. 61/553,691, filed Oct. 31, 2011, the entire disclosure of which is incorporated by reference herein for all purposes.

FIELD OF THE INVENTION

The present invention relates generally to sensing systems, and more particularly, to temperature, pressure and depth gauges.

BACKGROUND

Periodically checking a vehicle's tire pressures and tread depths is recommended to ensure its safe and efficient operation. As such, tire pressure gauges are popular tools for a driver to have at his or her disposal, as are tread depth gauges. It is also well understood that tire pressure is dependent on temperature. For example, when a vehicle with its tires initially at ambient temperatures (e.g. a vehicle that has been stationary for a period of time) is driven, the temperature of its tires generally increases, as the air within the tires is heated by, for example, friction generated between the tires and the road surface. This heating causes a corresponding increase in the tires' internal pressure. Likewise, changes in ambient temperatures affect a tire's internal pressure. As a result of this behavior, vehicle manufacturers generally supply recommended tire pressures which are associated with a particular temperature. More specifically, recommended tire pressures are typically given as "cold pressures", corresponding to the internal pressure of the tire measured when its temperature is around 20° C./68° F. to 22° C./72° F. (i.e. room temperature, hereinafter referred to as "nominal" temperature), as distinct from a "hot pressure", or a pressure measured when the tire's temperature is above this range. An exemplary "rule of thumb" used by many dictates that a change of temperature of +/−10° F. accompanies a rise or fall of pressure of about 1 psi. It follows that in order to accurately set tire pressures, knowledge of tire temperature at the time of measuring and/or filling/deflating may be required.

Alternative systems and methods for providing fast, convenient and accurate tire monitoring are desired.

SUMMARY

In one embodiment of the present invention, a system for measuring tire pressure and temperature is provided. The system includes a pressure sensor, a temperature sensor, a processor responsive to an output of the pressure sensor and the temperature sensor, and a display. The processor is configured to output a value on the display indicative of a measured tire pressure and an indication of measured tire temperature. The indication of the measured tire temperature comprises an indication of the result of a comparison between measured tire temperature and a predetermined temperature value.

In another embodiment of the present invention, a tire pressure and temperature measuring device is provided. The device includes a housing comprising a first portion and a second portion, having a pressure sensor arranged within the first portion of the housing and associated with a nozzle arranged on a first outer surface of the first portion of the housing, and a temperature sensor arranged within the first portion of the housing. The temperature sensor is associated with a first opening on the first outer surface of the first portion of the housing. The device further includes a processor arranged within the housing and responsive to an output of the pressure sensor and the temperature sensor, as well as a display arranged on a second outer surface of the first portion of the housing. The processor is configured to output a value indicative of at least one of a measured tire pressure and a measured tire temperature to the display.

Another embodiment of the present invention includes a method of operating a temperature and pressure measuring device. The method includes receiving by a processor measured tire temperature data and measured tire pressure data. The processor compares the measured tire temperature to a predetermined temperature value, and provides data indicative of to a display for displays a result of that comparison on a display along with the measured pressure.

DETAILED DESCRIPTION

Figure 1:
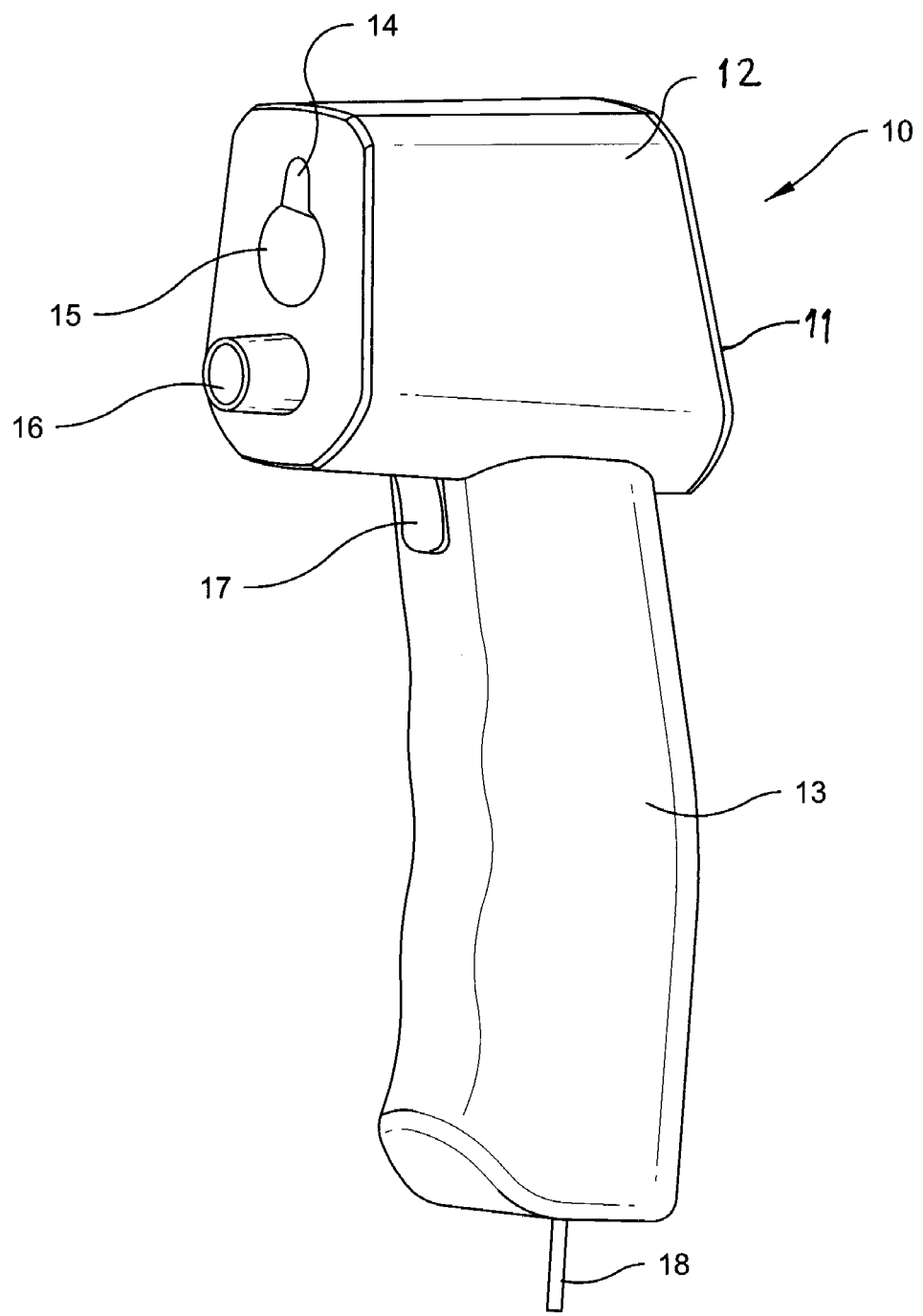
FIG. 1 is a perspective view of a combination temperature, pressure and depth measuring device according to an embodiment of the present invention.

It is to be understood that the figures and descriptions of the present invention have been simplified to illustrate elements that are relevant for a clear understanding of the present invention, while eliminating, for purposes of clarity, many other elements found in temperature, pressure and depth measuring devices. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present invention include measuring devices, such as handheld devices that provide for at least non-contact temperature measurements and pressure measurements in a single self-contained unit. Embodiments of the present invention may include a housing configured to be directed toward (i.e. aimed) at an object to facilitate temperature measurement via an infrared (IR) detector arranged within the housing. More specifically, an IR sensor may be mounted on or within the housing, and configured to sense IR radiation emitted from the object (or from a surface thereof) along a sensing axis extending from the housing. The IR sensor may output a signal indicative of the detected energy, which energy is indicative of the temperature of the object or surface, to a control circuit for subsequent processing and/or display.

Embodiments of the present invention may include an optical pointing device arranged within the housing. This device may emit visible light along an aiming axis to assist a user in pointing the IR detector at a desired target. The pointing device may comprise, for example, a laser diode or other source of a narrow visible light beam that may be arranged proximate to, or co-located with, the IR sensor. The housing may also include a pressure sensor in communication with a port for attaching to, for example, a Schrader valve of a tire. In one embodiment, a depth measurement device is also included and mounted on or within the housing. A display device may be provided on or within the housing for displaying measured temperature, pressure and/or depth values to a user.

Figure 2:
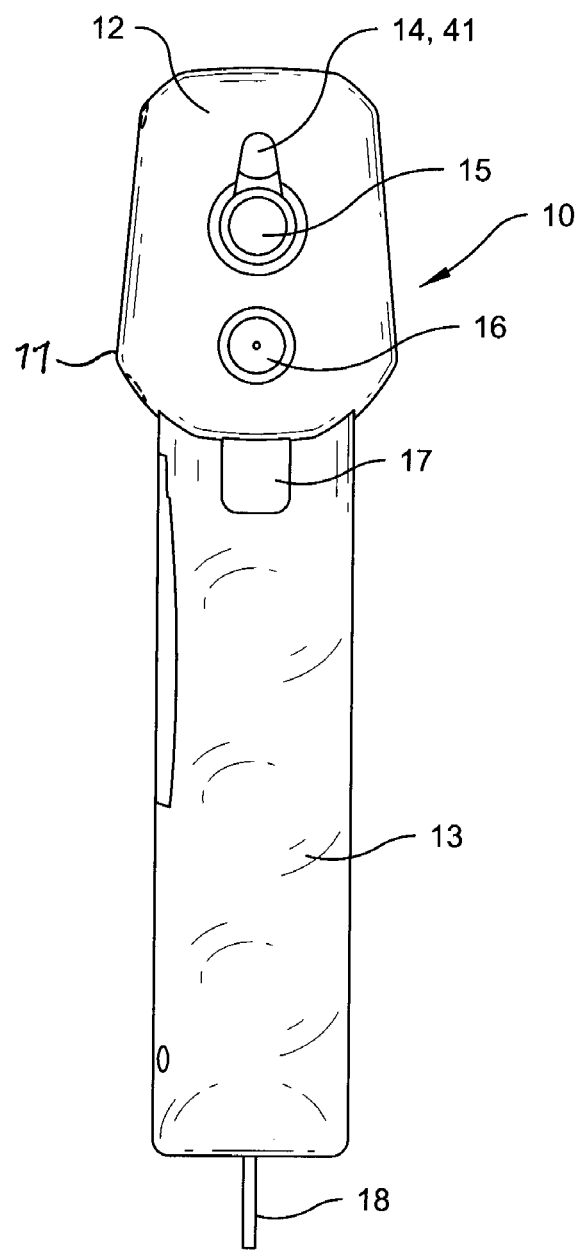
FIG. 2 is a front view of the embodiment of the present invention of FIG.
Figure 3:
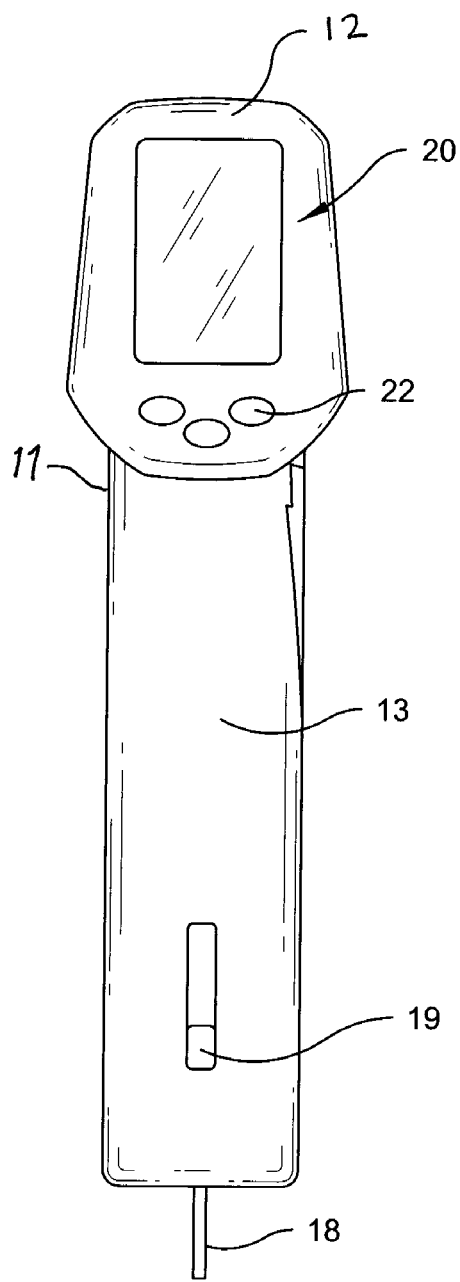
FIG. 3 is a rear view of the embodiment of the present invention of FIG.

Referring generally to FIGS. 1-3, a combination temperature, pressure and depth gauge or measuring device according to an exemplary embodiment of the present invention is shown. The gauge 10 includes, for example, a housing 11 comprising an upper housing portion 12 and a lower housing portion 13. In the illustrated embodiment, lower housing portion 13 comprises a handle having a generally elongated profile and including, for example, curved or contoured surfaces thereon configured to be held by a hand of a user. Lower housing portion 13 may also be configured to contain, for example, all or part of a depth measuring arrangement. The depth measuring arrangement may comprise, by way of non-limiting example only, a potentiometer operatively connected to a plunger 18 for measuring tread depth. In operation, a sliding actuator 19 (FIG. 3) may be arranged on a surface of housing 11, such as in lower housing portion 13, and attached to plunger 18, allowing a user to manually extend or retract plunger 18 with respect to housing 11 by urging sliding actuator 19 away from upper housing portion 12 to extend plunger 18, and toward upper housing portion 12 to retract plunger 18. Once extended, plunger 18 may be inserted into the tread void or groove of a tire, and housing 11 pressed flush with the tire's outer surface. Plunger 18 will be urged into housing 11, until its length extending beyond housing 11 is generally equal to the depth of the tire's tread. An output of the potentiometer corresponding to this length may be provided to a processing and/or display arrangement for providing a visual indication of the tire's tread depth to a user.

Upper housing portion 12 may include a first face comprising one or more ports or openings, such as an optical pointer opening 14 and a temperature sensor opening 15, as well as a nozzle 16 in communication with a pressure sensor. Nozzle 16 is adapted to engage with and open a valve (e.g. a needle or Schrader valve) of a tire valve stem in a conventional manner for providing pressurized fluid to the pressure sensor. An optical pointing aid, such as an LED or other light source with suitable lensing, or laser source (e.g. a laser pointer), may be arranged within opening 14, while a temperature sensor, such as an IR sensor/detector, may be arranged within opening 15. As set forth above, the IR sensor may detect radiated energy along a sensing axis extending from opening 15. The optical pointing aid is arranged proximate to, or co-located with, the IR sensor. In this way, the illuminated aiming axis and the IR-sensing axis may be essentially parallel (or slightly angled) to one another, such that the optical pointing aid illuminates a dot or other small area on the surface of an object toward which the IR sensor is directed, providing a user with immediate visual feedback as to the aiming of the IR sensor. The user may thus accurately aim the IR sensor toward a desired target (e.g. a tire's tread or sidewall) while performing a temperature measuring operation.

Figure 8:
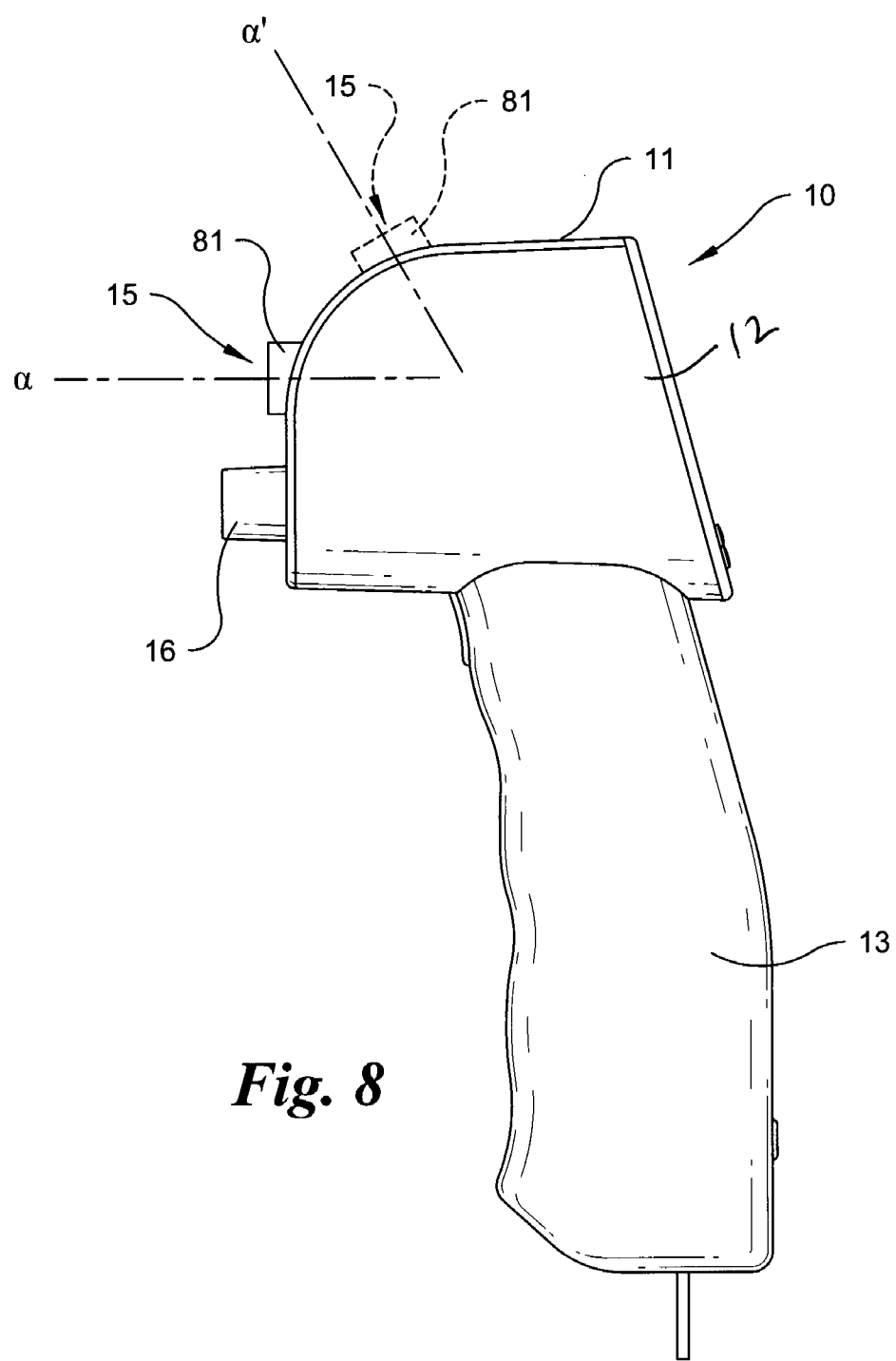
FIG. 8 is a side view of a combination temperature, pressure and depth measuring device according to another embodiment of the present invention.

Referring generally to FIG. 8, in yet another embodiment of the present invention, IR-sensing axis $\alpha$, and more preferable IR-sensing axis $\alpha$ and the illuminated aiming axis, may be oriented at a predetermined non-zero angle with respect to at least nozzle 16 (or an axis thereof). More specifically, the angle between nozzle 16 and IR-sensing axis $\alpha$ may fixed such that when nozzle 16 is attached to a valve of a tire, IR-sensing axis $\alpha$ is aimed generally at the sidewall of the tire. In this way, simultaneous temperature and pressure measurements may be made by a user. In other embodiments, at least one of the IR sensor and nozzle 16 may be adjustable in angular orientation. Referring still to FIG. 8, in one exemplary embodiment, opening 15 and an associated IR sensor (and pointing aid) may be mounted within a second housing 81. Second housing 81 may be moveably (e.g. slidably or rotatably) mounted to upper housing portion 12 of housing 11 such that the IR-sensing axis angle may be adjusted relative to nozzle 16 (e.g. between positions indicated by IR-sensing axes $\alpha$ and $\alpha^1$). In this way, a user may, for example, connect nozzle 16 to the valve of a pneumatic tire, and adjust either the angular position of nozzle 16 or the angular position of the IR sensor so the IR-sensing axis is oriented at the tire's sidewall.

Referring again to FIGS. 1-2, a user input, such as a trigger, actuator or button 17, may be provided on housing 11 in a convenient location for actuation by a user holding gauge 10 in a conventional fashion. In one embodiment, trigger 17 may be used to activate one or more of the device functions. For example, trigger 17 may be used to actuate the light pointing function alone, or in conjunction with a temperature measuring function. Trigger 17 may be located on lower housing portion 13 adjacent upper housing portion 12, as illustrated in FIGS. 1 and 2, thereby facilitating actuation by a user's index finger while holding lower housing portion 13.

With respect to FIG. 3, a second face of upper housing portion 12 may include a user interface including, for example, one or more user-interface buttons 22, as well as a display 20. The second face of upper housing portion 12 may be generally opposite to the first face of upper housing portion 12. As the second face is generally opposite to the first face, the user may observe displayed temperature and pressure readings on display 20, and control device functions using buttons 22, while taking tire pressure and temperature readings. Buttons 22 may provide control of device functions, including, but not limited to, temperature scanning, pressure measurements, tread-depth measurements, and reset functions. In one embodiment, depressing a button associated with a function may initiate one or more modes of operation, including associated processing functions specific to that mode.

Figure 4:
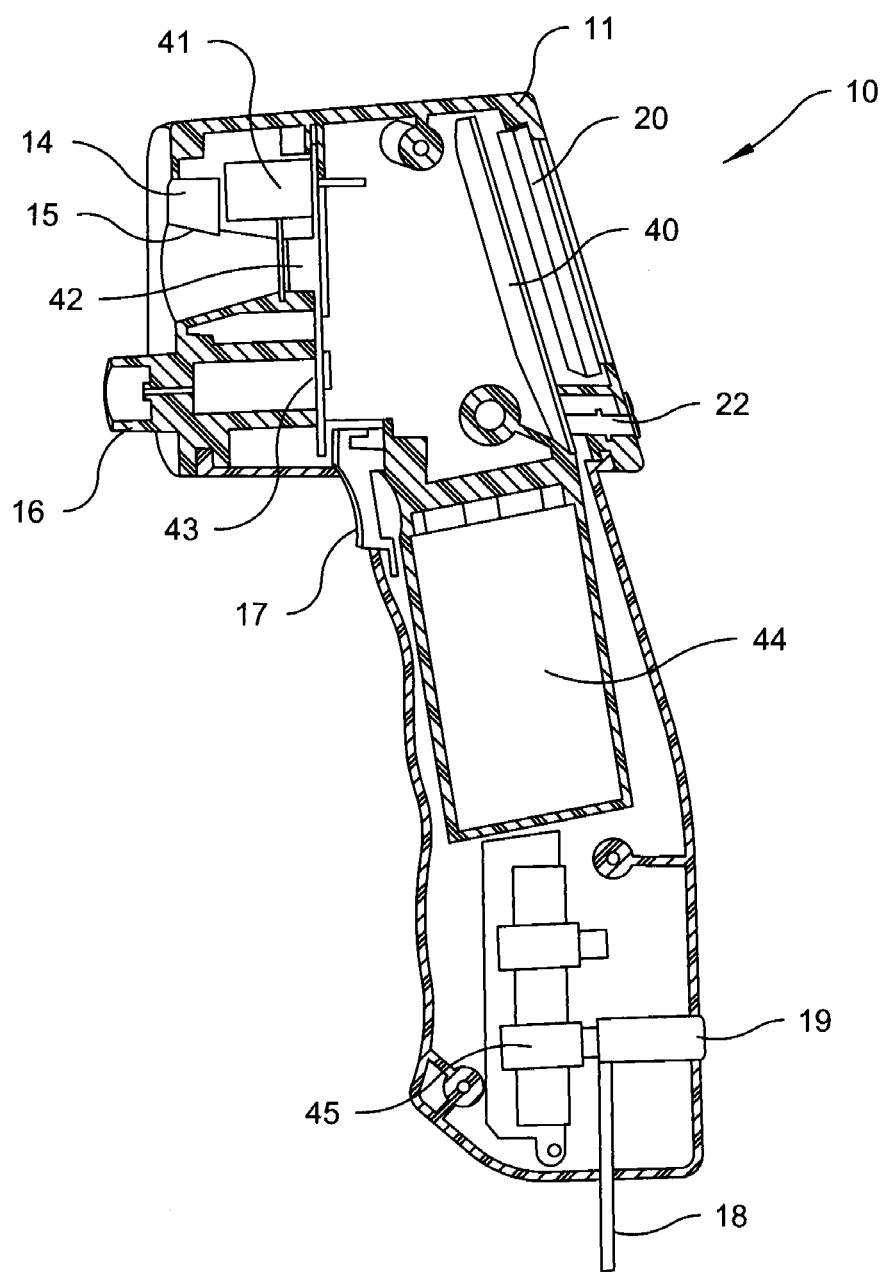
FIG. 4 is a cross-sectional view of the embodiment of the present invention of FIG. 1.

FIG. 4 is a cross-sectional view of the device of FIGS. 1-3. As illustrated, housing 11 of gauge 10 may be generally hollow for accommodating each of the temperature, pressure and depth-measuring sub-systems, and their associated control processor(s). As set forth above, gauge 10 may comprise one or more ports or openings on a first face thereof associated with a corresponding sensing or output device. For example, opening 15 is associated with IR sensor 42, opening 14 is associated with laser source 41, and nozzle 16 is arranged in communication with a pressure sensor 43. Nozzle 16 is in physical communication with a sealed chamber in which pressure sensor 43 is located, so that opening of nozzle 16 causes fluid under pressure, e.g., air from a pressurized tire, to enter the sealed chamber. In the illustrated embodiment, each of IR sensor 42, laser source 41 and pressure sensor 43 are arranged on a common circuit board mounted to and held within housing 11. Arranged in the lower housing portion 13 of housing 11 may be the depth measuring arrangement, including, for example, plunger 18 and sliding actuator 19 operatively connected to a potentiometer 45.

A second circuit board 40 may be provided within housing 11 for mounting control circuitry, including a processing system, thereto. One or more of IR sensor 42, laser source 41, pressure sensor 43, trigger 17, potentiometer 45 and buttons 22 may be operatively connected to this processing system. The output of the processing system may be provided to a display 20 operatively connected to second circuit board 40. A power supply 44, such as a battery, may be arranged within housing 11 for powering any or all of the sensors and their associated control circuitry.

Figure 5:
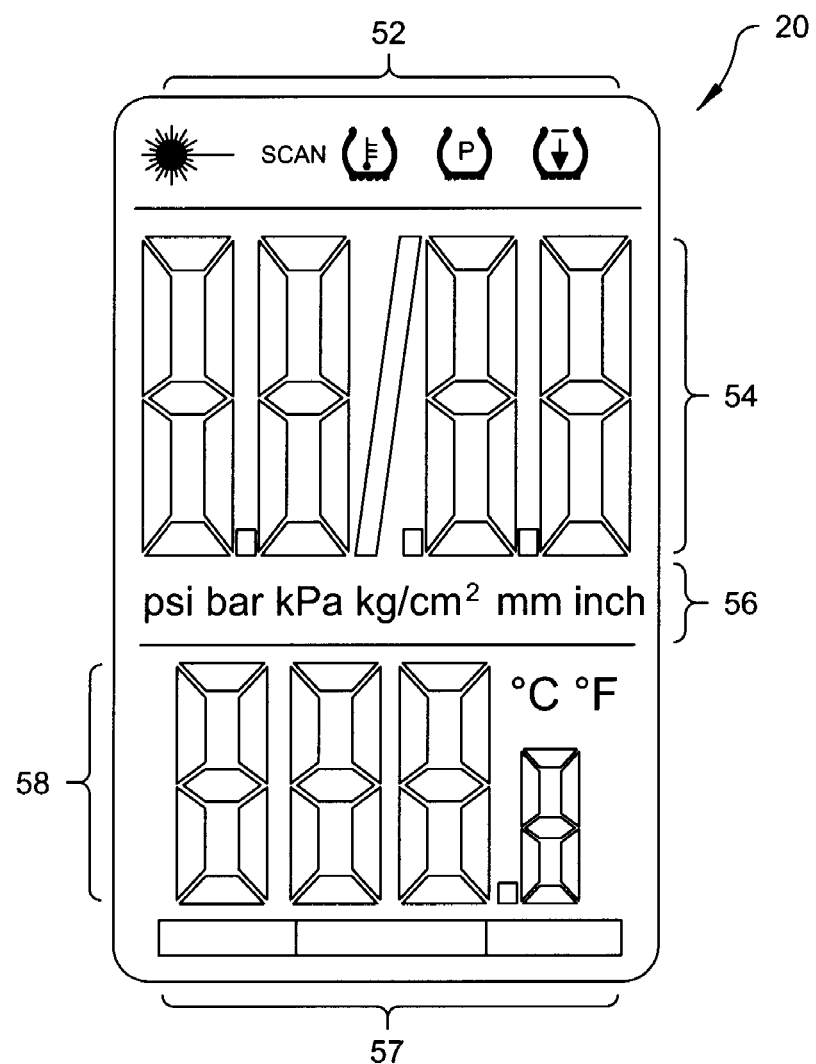
FIG. 5 is a graphical representation of a display screen for an embodiment of the present invention.

Referring generally to FIG. 5, an exemplary display 20 is shown. As noted above, display 20 may comprise, by way of non-limiting examples only, an LCD, LED, or OLED screen for displaying measured information, as well as device operating status. In the illustrated embodiment, display 20 comprises a first series of indicators 52 comprising a plurality of lights, or back-lit icons, indicating, for example, the state of the optical pointer (on or off), a temperature scan in progress, as well as the current selected mode of operation. Modes of operation may include temperature measurement mode, pressure measurement mode, and/or depth measurement modes. Depending on a selected mode of operation, screen sub-section 54 may comprise an area for displaying measured results of tire pressure and/or tread depth, with accompanying units (e.g. pressure and/or depth, with one or more types of measuring units for each) being displayed by a second series of indicators 56. Screen sub-section 58 may configured to display a measured tire temperature and to selectively illuminate icons to indicate Celsius or Fahrenheit measuring units.

Embodiments of the present invention may provide an additional set of indicators configured to alert a user to a tire's measured pressure in the context of its temperature. For example, screen sub-section 57 may include indicators for providing a user information regarding the current measured tire temperature as it relates to the nominal temperature, and thus to a manufacturer's recommended pressure associated with this nominal temperature. In the exemplary embodiment, the temperature indicators may be color-coded (e.g. red, yellow and green). If, for example, the tire temperature is measured to be within a predetermined range, such as a range defining nominal temperature (e.g. 20° C./68° F. to 22° C./72° F.), a green indicator may be displayed. However, if a measured tire temperature is above this temperature range (e.g. greater than 22° C./72° F.), a red indicator, for example, may be illuminated, indicating to a user that a tire pressure measurement reading will be higher than one made at nominal temperatures. In response to this indication, a user may take tire temperature under consideration using, for example, the +/−10° F. per psi rule, while calculating any necessary adjustments to tire pressure. Likewise, if the measured temperature of the tire is below the nominal temperature range (e.g. less than 20° C./68° F.), a yellow indicator may be illuminated, indicating that the measured tire pressure will read lower compared to measurements made at nominal temperatures, and the tire pressure may need to be adjusted accordingly. Thus, these indicators aid a user in more accurately setting tire pressures by taking into account the temperature of the tire at the time of the pressure measurement.

It should be understood that other exemplary indicators, such as other color schemes (e.g. blue for below a nominal range, gray for within the nominal range and red for above the nominal range), text, graphical, or symbol-based indicators may be implemented without departing from the scope of the present invention.

In other embodiments of the present invention, the processing system may be programmed to calculate, for example, a value indicative of a pressure change associated with a measured differential between the tire's measured temperature as compared to nominal conditions, including whether the differential is above or below nominal conditions. For example, the processor may be programmed to utilize the general rule of +/−10° F. per psi to indicate how much, and in what direction, a tire's measured pressure has been shifted ($\Delta P_T$). More specifically, if the processor determines based on IR sensor data that the tire temperature is, for example, 20° F. above nominal (e.g. 88-90° F.), the processor may cause the display to indicate to a user that the tire pressure is reading approximately two psi higher than it would at nominal temperatures.

Further still, the processor may be configured to display a temperature-adjusted pressure to a user. More specifically, the processor may output the measured pressure value adjusted for the calculated temperature-dependent pressure change ($\Delta P_T$), wherein:

$$P_{Adjusted} = P_{Measured} +/- \Delta P_T$$

From this information, a user can more easily determine what adjustments to the tire pressure are necessary in order to achieve the factory recommended settings.

Moreover, the processor may be configured to store a target tire pressure, or target tire pressure range, in a data storage device of the processing system. For example, a user may enter the manufacturer's recommended cold tire pressure range into the device, wherein the entered value may be stored for further processing. The device may be configured to permit a user to select an operating mode for input of a recommended cold tire pressure value, or values of upper and lower limits of a recommended cold tire pressure range, such as by using buttons 22. Using this information, the processor may be operative to, for example, compare a stored recommended cold tire pressure value, or compare an upper and a lower value of the stored target pressure range, to a measured pressure, and output an indication to the user if the measured tire pressure does or does not fall within this range, or is outside of a maximum range above or below a set value. Likewise, the processor may give an indication of whether a measured pressure falls above, below, or within this predetermined pressure range. Further still, the processor may be operative to make comparisons between a temperature-adjusted measured tire pressure and the target pressure or pressure range. Similarly, the processor may adjust the target tire pressure, or target tire pressure range for a measured temperature, and compare this adjusted pressure range to the measured, uncorrected tire temperature. In any of these embodiments, indications may be provided by, for example, the above-described color-coded indicators.

Figure 6:
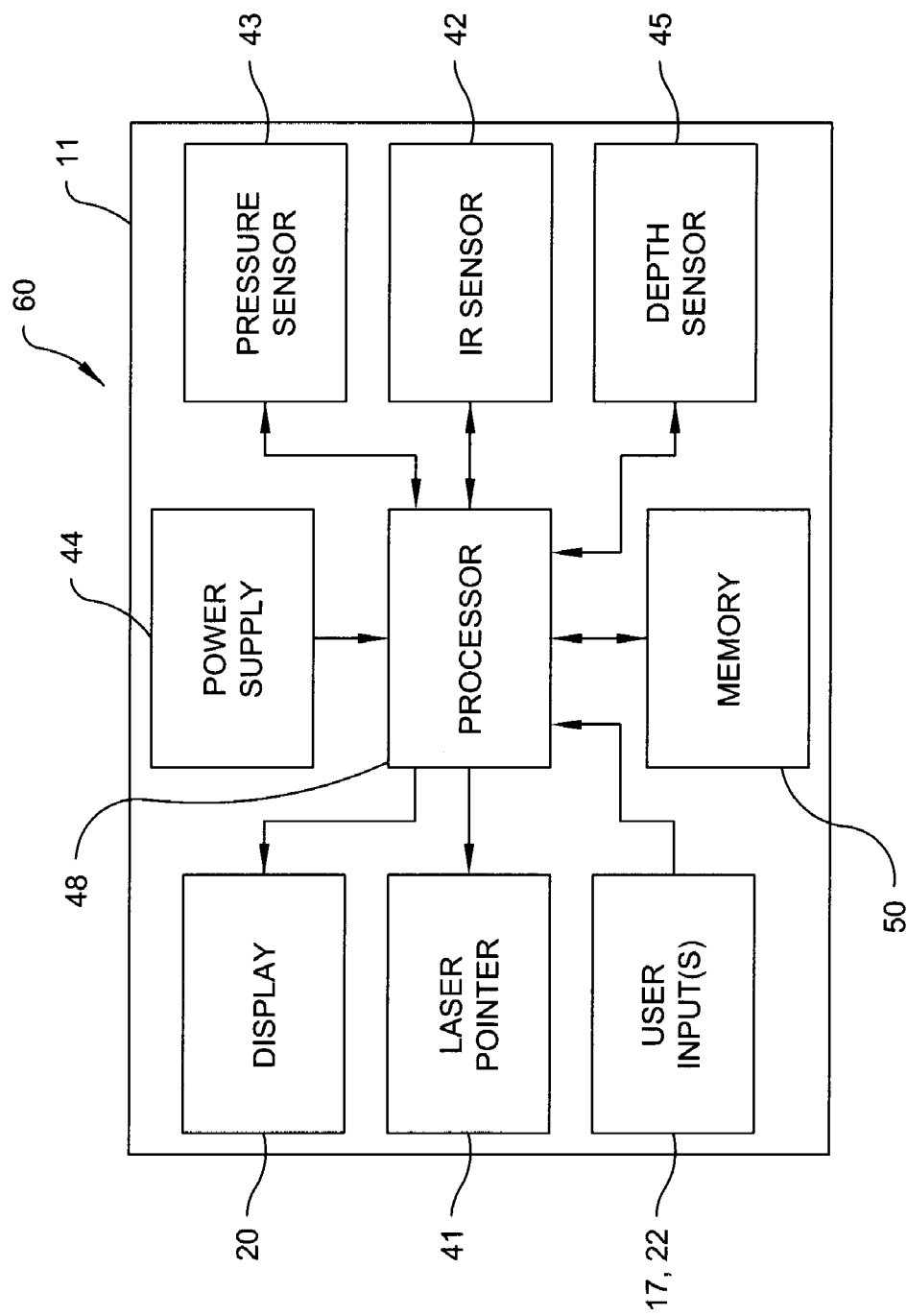
FIG. 6 is a schematic diagram of an exemplary sensory and control circuit arrangement according to an embodiment of the present invention.

Referring generally to FIG. 6, a simplified diagram of a sensor and control arrangement 60 is provided according to an embodiment of the present invention. Embodiments of the present invention may be controlled by one or more processors 48 receiving inputs from any or all of the sensors described above. "Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

For example, processor(s) 48 may receive inputs from pressure sensor 43, IR sensor 42, and potentiometer 45. Processor(s) 48 may be responsive to these input signals to generate outputs corresponding to measured temperature, pressure and/or tread depth. These outputs may be provided to a user via display 20. Processor(s) 48 may also be responsive to user inputs, such as those received from trigger 17 for controlling the function of laser source 41, or to inputs received through buttons 22. One or more memory devices 50 may also be in communication with processors 48. Memory devices 50 may be configured to store, for example, instructions executable by processors 48 for performing the described device functions, nominal temperature values, measured data (e.g. temperature, pressure, depth), as well as user-input data, such as the above-described predetermined pressure values or ranges thereof. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Power supply 44, such as one or more batteries, may be provided for powering processor(s) 48, as well as for powering any or all of the remaining system components. Each of the foregoing components may be mounted in or on housing 11.

It should be noted that embodiments of the present invention may include any number of additional components not shown in the simplified schematic of FIG. 6 for the purposes of brevity. For example, the outputs of any or all of the sensors may comprise analog signals which may be provided to one or more analog to digital converters (ADCs) before being input to processor(s) 48. Likewise, the output from processor(s) 48 may provide appropriate control signals either directly to display 20, or to a display driver that subsequently provides for control of the display. For any mode of operation, a hold circuit may be used to hold a measured reading in memory, and/or on display 20 for a period of time after a measurement has been taken, allowing a user time to analyze the information after taking a measurement.

Moreover, regarding temperature measurement, because actual temperature as determined by IR emissions is a function of an object's (e.g. a tire) emissivity, processor(s) 48 may utilize a fixed emissivity constant (typically about 0.95) to calculate an accurate temperature from the output of IR sensor. In other embodiments, the device may allow a user to input an emissivity constant for use by the processor to calculate temperature.

Figure 7:
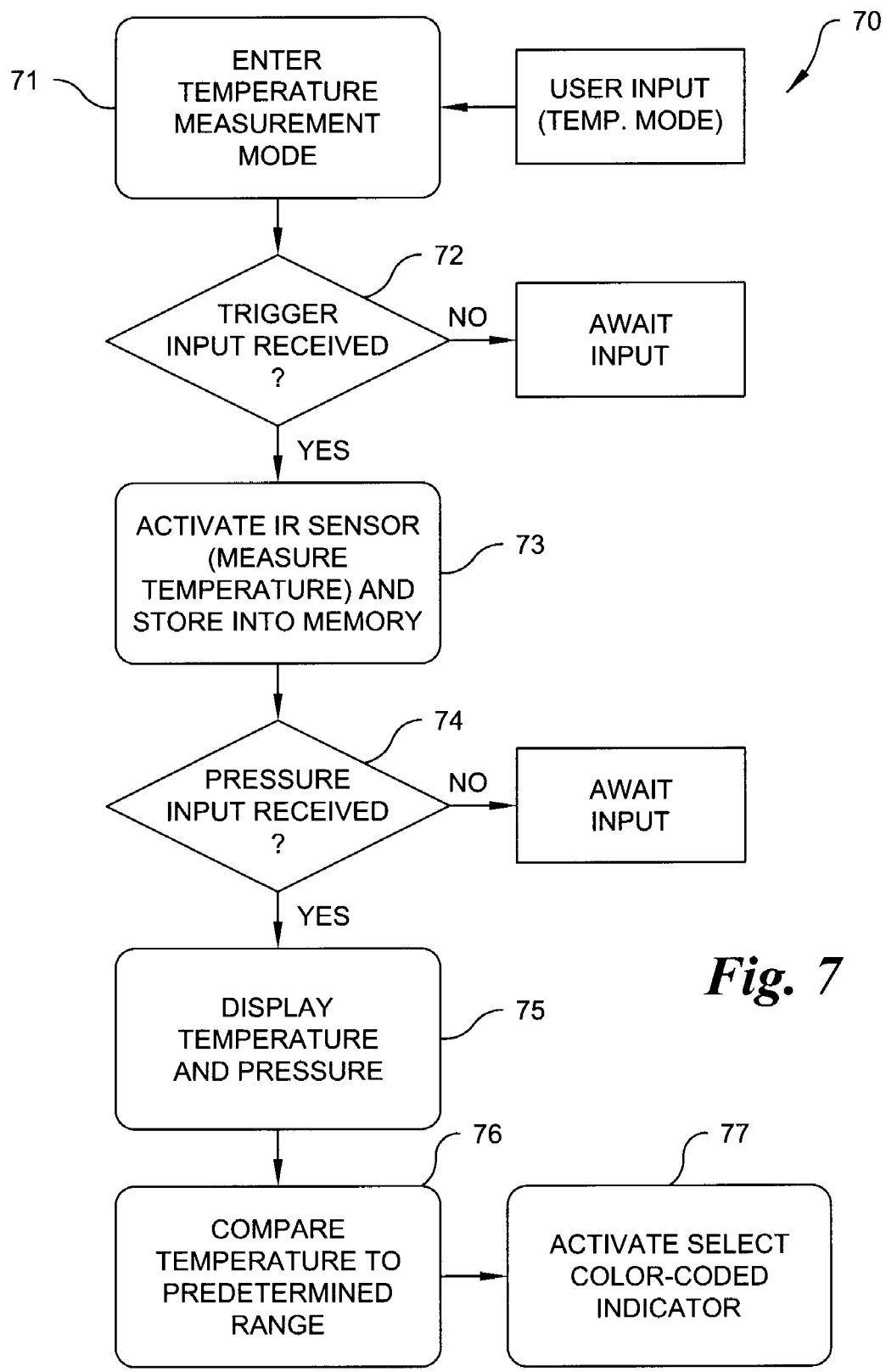
FIG. 7 is process flow diagram illustrating an exemplary mode of operation of a device according to an embodiment of the present invention.

Referring generally to FIG. 7, an exemplary method of operation of the device is provided. Method 70 generally includes a process for measuring a tire's temperature and pressure, wherein the user is provided an alert indicating whether the measured pressure is above, below, or within a temperature range corresponding to a manufacturer's recommended tire pressure. In step 71 of the exemplary method, a user may place the device into a temperature measuring mode by pressing a button indicative of a temperature mode, the device will then await an input signal from, for example, trigger 17, indicating that the device is aimed at the tire (step 72). Upon receipt of an input from trigger 17, the device will activate an IR sensor and an optical pointer in step 73, and a measurement of the tire's temperature will be recorded, displayed, and/or stored into memory. A user desiring only a temperature measurement may read the measured temperature off of the device display, after which the device will wait a predetermined period of time before, for example, turning itself off. However, referring generally to step 74, if within the predetermined period of time, an input signal from the pressure sensor is received (indicating the user has associated the nozzle of the pressure sensor with a valve of the tire), the device will enter into a combination temperature/pressure mode. In this mode, tire pressure may be displayed along side the measured tire temperature. The processor may then compare the measured temperature to the above-described nominal temperature range in step 76. In step 77, depending on the results of this comparison, the device will activate an indicator signaling a measured temperature at, above or below the nominal range (e.g. with the red, green and yellow indicators), signaling to a user how the measured pressure has been affected by the tire's temperature. In this way, a user will be alerted to the need to adjust the tire's pressure to account for this temperature bias.

The exemplary illustrations are provided by way of example only, and other embodiments for implementing the processes described herein may be contemplated by one of skill in the pertinent art without departing from the intended scope of this disclosure. For example, the processes may be implemented, by way of example, by memory containing instructions, the instructions when executed by a processor, cause the steps of the described methods for measuring tire pressure, temperature, and depth to be performed. It is understood that these may also be performed in hardware. Thus, the entire process or any part thereof, may be performed in hardware, software or any combination of hardware and/or software. Software may be embodied in a non-transitory machine readable medium upon which software instructions may be stored, the stored instructions when executed by a processor cause the processor to perform the steps of the methods described herein.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A tire pressure and temperature measuring device comprising:
   a housing comprising a first portion and a second portion, the second portion of the housing defining a handle configured to be held by a hand of a user for supporting the first portion of the housing;
   a nozzle arranged on a first outer surface of the first portion of the housing;
   a pressure sensor within the first portion of the housing and associated with the nozzle;
   a temperature sensor, for measuring a temperature of a surface of a tire, within the first portion of the housing, the temperature sensor aligned with a first opening on the first outer surface of the first portion of the housing;
   an optical pointer, aligned with a second opening on the first outer surface of the first portion of the housing, and arranged to illuminate a portion of the surface of the tire during measurement of the temperature of the surface of the tire by the temperature sensor;
   a display arranged on a second outer surface of the first portion of the housing for viewing by the user while holding the handle during measurement of the temperature of the surface of the tire by the temperature sensor; and
   a processor arranged within the housing and responsive to outputs of the pressure sensor and the temperature sensor, the processor configured to output a value indicative of a measured tire pressure and a value indicative of a measured tire temperature to the display.

2. The device of claim 1, wherein the temperature sensor comprises an IR sensor having a sensing axis, and wherein the temperature sensor is at least one of slideably and rotatably mounted to the first portion of the housing such that the orientation of the sensing axis may be adjusted relative to the first portion of the housing.

3. The device of claim 1, further comprising:
   a depth measuring sensor arranged within the second portion of the housing; and
   a moveable plunger extending from an end of the second portion of the housing opposite to the first portion of the housing,
   wherein the depth measuring sensor is configured to output to the processor a value indicative of a length of the plunger extending from the end of the second portion of the housing;
   and wherein the display and the plunger are arranged so that the display is visible to the user when the plunger is extended into a tire tread.

4. The device of claim 1, wherein the processor is further configured to calculate a value of a pressure change associated with the measured tire temperature compared to a nominal condition and output the calculated value of the pressure change to the display.

5. The device of claim 4, wherein the processor is further configured to output an indication on the display of whether the pressure change is an increase or a decrease compared to a pressure associated with the nominal condition.

6. The device of claim 1, wherein the processor is further configured to calculate and output on the display a value indicative of a temperature-adjusted pressure according to the measured pressure and measured temperature.

7. The device of claim 6, wherein the processor is configured to calculate the temperature-adjusted pressure according to the following relationship:

$$P_{Adjusted} = P_{Measured} +/- \Delta P_T$$

wherein $\Delta P_T$ is a calculated temperature-dependent pressure change, $P_{Measured}$ is the measured pressure, and $P_{Adjusted}$ is the temperature-adjusted pressure.

8. The device of claim 1, wherein the first opening is arranged directly adjacent to the second opening.

9. The device of claim 1, wherein the first outer surface is arranged on a side of the first portion of the housing generally opposite the second outer surface.

10. The device of claim 1, further comprising an actuator arranged on the second portion of the housing and operative to control the operation of the optical pointer, the temperature sensor and the pressure sensor.

11. The device of claim 1, wherein the indication of measured tire temperature comprises one of a discrete:
   first indication if the measured tire temperature is above a predetermined temperature range;
   second indication if the measured tire temperature is below the predetermined temperature range; and
   third indication if the measured tire temperature is within the predetermined temperature range.

12. A method of detecting and displaying tire temperature and pressure with a hand-held measuring device, comprising:
   illuminating an area of a tire with an optical pointer radiating from a first outer surface of the measuring device;
   measuring the temperature of the tire proximate the illuminated area with a temperature sensor having a sensing axis extending from the first outer surface of the measuring device;
   receiving by a processor of the measuring device data indicative of the measured tire temperature from the temperature sensor;
   measuring tire pressure by providing, via a nozzle arranged on the first outer surface of the measuring device and engaged with a valve of the tire, air from the tire to a pressure sensor of the measuring device;

receiving by the processor data indicative of the measured tire pressure from the pressure sensor; and outputting from the processor to a display a value indicative of a measured tire pressure and a value indicative of a measured tire temperature.

13. The method of claim 12, wherein the display is arranged on a second outer surface of the measuring device arranged generally opposite the first outer surface of the measuring device.

14. The method of claim 12, wherein the temperature sensor comprises an IR sensor having a sensing axis, and wherein the temperature sensor is at least one of slideably and rotatably mounted to the measuring device such that the orientation of the sensing axis may be adjusted relative to the measuring device.

15. The method of claim 12, further comprising the step of measuring a tread depth of the tire by a depth measuring sensor, the depth measuring sensor comprising a moveable plunger extending from an end of a handle of the measuring device, wherein the depth measuring sensor is configured to output to the processor a value indicative of a length of the plunger extending from the end of the handle of the measuring device.

16. The method of claim 12, further comprising the steps of calculating by the processor, and outputting from the processor to the display, a value indicative of a calculated pressure change associated with the measured tire temperature compared to a nominal condition.

17. The method of claim 16, further comprising the steps of determining by the processor, and outputting from the processor to the display, an indication of whether the pressure change is an increase or a decrease compared to a pressure associated with the nominal condition.

18. The method of claim 12, further comprising the steps of calculating by the processor, and outputting from the processor to the display, a value indicative of a temperature-adjusted pressure according to the measured pressure and measured temperature.

19. The method of claim 18, wherein the temperature-adjusted pressure is calculated according to the following relationship:

$$P_{Adjusted} = P_{Measured} +/- \Delta P_T$$

wherein $\Delta P_T$ is the calculated temperature-dependent pressure change, $P_{Measured}$ is the measured pressure, and $P_{Adjusted}$ is the temperature-adjusted pressure.

20. The method of claim 12, wherein the steps of illuminating the area of the tire with the optical pointer, measuring the temperature of the tire proximate the illuminated area and measuring the tire pressure include the step of receiving an activation signal from an actuator arranged on a handle of the measuring device.

21. The method of claim 12, wherein the indication of measured tire temperature comprises one of a discrete:
 first indication if the measured tire temperature is above a predetermined temperature range;
 second indication if the measured tire temperature is below the predetermined temperature range; and
 third indication if the measured tire temperature is within the predetermined temperature range.

\* \* \* \* \*